March 20, 1956
R. J. HARTZ ET AL
2,738,685
ACTUATORS
Filed April 16, 1952
2 Sheets-Sheet 1
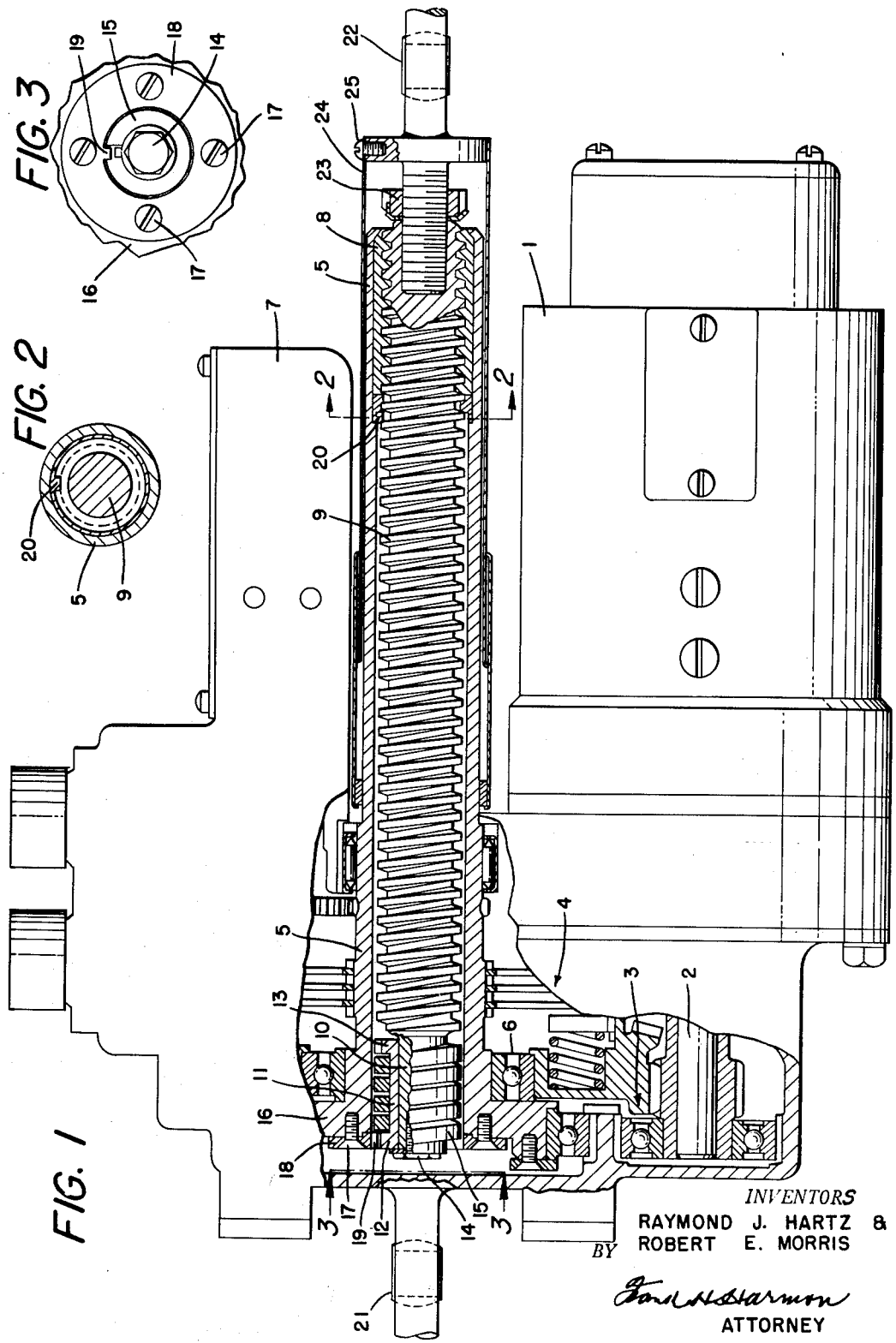
INVENTORS
RAYMOND J. HARTZ &
ROBERT E. MORRIS
BY
ATTORNEY

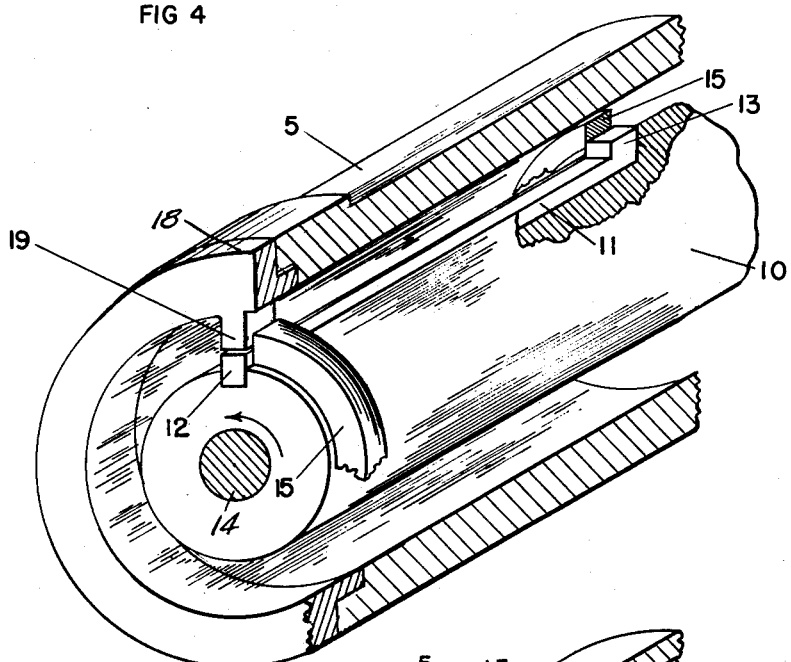
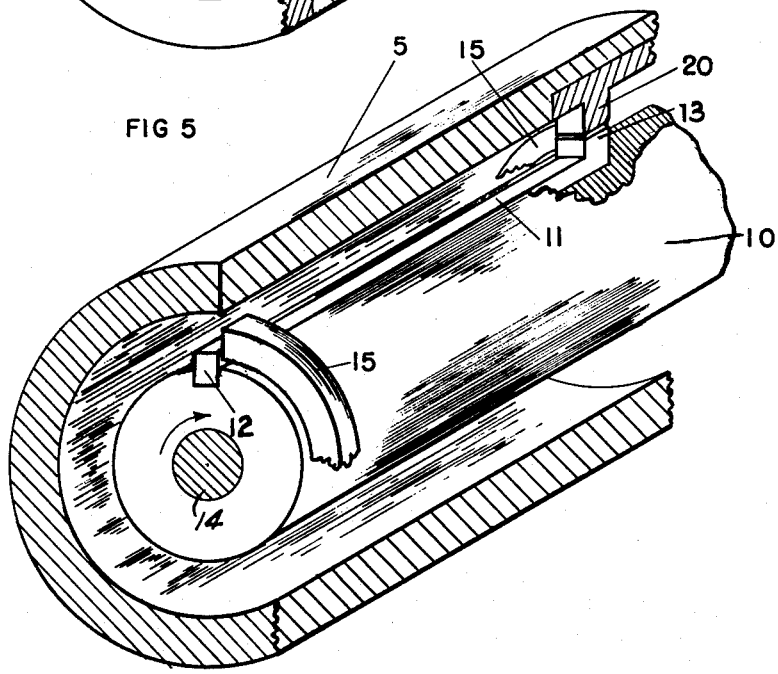

United States Patent Office 2,738,685
Patented Mar. 20, 1956

2,738,685
ACTUATORS

Raymond J. Hartz, Cuyahoga Falls, and Robert E. Morris, Lyndhurst, Ohio, assignors to Jack & Heintz, Inc., Cleveland, Ohio, a corporation of Delaware Application April 16, 1952, Serial No. 282,726

4 Claims. (Cl. 74—424.8)

This invention relates in general to actuators and more particularly to actuators for extending aircraft components, such as landing gear, wing flaps, bomb bay doors, and the like.

Such a device usually includes a reversible electric motor, a planetary reduction gear train, a torque limiter, a rotatably driven torque tube, an internal torque tube nut and an actuator screw driven linearly by the nut in a direction corresponding to the direction of rotation of the torque tube for extending and retracting the aircraft component.

Difficulty has been encountered in the actual operation of the conventional actuator which requires fast linear movement and sudden stops and reversals between the precision defined limits of full retraction and full extension. This is due partly to inadequate provision of proper shock absorption and also inadequate protection against the possibility of the actuator becoming jammed in either of its two extreme positions, against the proper desired movement.

It is therefore one of the primary objects of this invention to provide means whereby there will be obtained, prior to the completion of the linear movement of the actuator screw in each direction, a gradually increasing resilient and frictional resistance shock absorption, as well as the gradual building up of a force that will materially enhance the initiation of a reverse movement of the screw upon reversal of the motor in order to positively insure against the actuator from becoming jammed in either of its two extreme positions.

With the foregoing and other objects in view, the invention resides in the combination of parts and in the details of construction set forth in the following specification and appended claims, certain embodiments thereof being illustrated in the accompanying drawings, in which:

Figure 1 is a view, partly in side elevation and partly in longitudinal section of the actuator assembly, showing in section a part of the electric motor driven gear train, the rotatably driven torque tube and nut, the linearly driven actuator screw, the helical spring and carrier carried by the screw and the two longitudinally spaced stops carried by the torque tube for alternately engaging the helical spring for shock absorption and jamming prevention;

Figure 2 is a view in cross section taken along line 2—2 of Figure 1;

Figure 3 is a view in cross section taken along line 3—3 of Figure 1;

Figure 4 is a fragmentary view in perspective, partly in longitudinal section, showing the inner end of the helical spring engaging an internal stationary lug and the inner lug of the key to expand the spring into frictional engagement with the inner surface of the torque tube, similarly as shown in Figure 1; and Figure 5 is a view similar to Figure 4, showing the outer end of the helical spring engaging an outer lug within the torque tube and the outer lug of the key to expand the helical spring into frictional engagement with the inner surface of the torque tube near the completion of the extension stroke of the actuator assembly.

Referring more particularly to the drawings, the assembly includes a conventional reversible electric motor mounted in a housing 1 having an output shaft 2 and a conventional planetary reduction gear train, generally indicated at 3 with a torque limiter, generally indicated at 4, for rotatably driving a torque tube 5 supported by bearings 6 in a housing 7. Inside of torque tube 5 near its output end, or right end, as shown in Figure 1, is rigidly secured an appreciably long internally threaded nut 8 to engage the high pitch external threads of an elongated actuator screw 9 mounted for rotation with radial clearance in the torque tube. Thus, as the torque tube is driven in a given direction by the reversible motor, the torque tube nut 8 moves the actuator screw linearly in the corresponding direction.

Near the input end, or left end, the actuator screw 9 is reduced in diameter at 10 and is unthreaded and longitudinally slotted to receive a key 11 with longitudinally spaced radial flanges 12 and 13 and maintained on the screw extension 10 by a nut 14. Surrounding the key 11 is a helical spring 15. Secured to the flange 16 of the torque tube by bolts 17 is a plate 18 carrying a radially inwardly extending lug 19. Immediately to the left of the torque tube nut 8, there is rigidly mounted on the inner surface of the torque tube 5 a shallow ring 20.

Clevis 21 is for attaching the actuator and motor assembly to the aircraft. Clevis 22 is screwed into the output end of the actuator screw 9 and maintained in adjusted position by a nut 23. The usual dust tube 24 is secured by bolts 25 to clevis 22, which latter is suitably secured to the work to be done, such as linkages for operating landing gears, wing flaps, and the like.

Figures 1 and 4 show the actuator screw 9, and consequently the aircraft component connected to clevis 22, in full retracted position. The convolutions of the helical spring 15 extend radially outwardly from the actuator screw, a greater distance than the radial flanges 12 and 13 of the key 11 carried in a longitudinal slot of the screw. However, the spring convolutions are normally clear of the inner surface of the torque tube 5 during the major portion of travel of the screw between its two extreme end positions. However, during the linear movement of the screw to its retracted position of Figure 1, the left end of the helical spring 15 has engaged the stop lug 19. As the linear movement of the screw has continued to the left to retracted position, the result has been the unwinding of the helical spring 15 and the radial expansion thereof into frictional sliding engagement with the inner surface of the torque tube 5. The result has been a gradual increasing combined resilient and frictional shock absorption of the movements of the screw into its full retracted position of Figure 1.

Upon reversal of the motor to linearly drive the screw to the right, or extended position, the pent up energy in the temporarily distorted spring has prevented the screw from becoming jammed in its retracted position. It has also materially assisted in initiating the reverse screw movement. As shown in Figure 5, this drive continues and near the end of the extension stroke of the screw, the other, or right, end of the helical spring 15 similarly engages the stop 20 carried rigidly on the inner surface of the torque tube, resulting in the same resilient and frictional shock absorption and jamming prevention as the helical spring becomes temporarily distorted by being unwound and radially expanded into frictional longitudinal sliding engagement with the inner surface of the torque until the completion of the stroke.

We claim:

1. In a reversible motor driven actuator, a rotatably driven torque tube and torque tube nut, an actuator screw linearly driven by said nut, longitudinally spaced stops extending radially inwardly into said tube, a key extending into a longitudinal slot in a reduced unthreaded end extension portion of said screw and having radial end flanges, a helical spring encircling said key and extending between said end flanges, and mounted with radial clearance inside of said torque tube, the corresponding end of said helical screw being inside of said torque tube, the corresponding end of said helical screw being adapted to engage the corresponding stop near the end of linear movement of said screw in that direction so as to unwind said helical spring and expand the same into frictional sliding engagement with the inner surface of said torque tube for the purpose of shock absorption and prevention of jamming of said screw in each limit of linear movement.

2. In a reversible motor driven actuator, a rotatably driven torque tube and torque tube nut, an actuator screw linearly driven by said nut, longitudinally spaced stops extending radially inwardly into said tube, a key extending into a longitudinal slot in a reduced unthreaded end extension portion of said screw and having radial end flanges, a helical spring encircling said key and extending between said end flanges, the corresponding end of said helical spring being adapted to engage the corresponding stop near the end of linear movement of said screw in that direction so as to unwind said helical spring and expand the same into frictional sliding engagement with the inner surface of said torque tube for the purpose of shock absorption and prevention of jamming of said screw in each limit of linear movement.

3. In a reversible motor driven actuator, a rotatably driven torque tube and torque tube nut, an actuator screw linearly driven by said nut, longitudinally spaced stops carried by an unthreaded extension of said tube, a key carried by said screw, a helical spring encircling said key, the corresponding end of said helical spring being adapted to engage the corresponding stop near the end of linear movement of said screw in that direction so as to unwind said helical spring and expand the same into frictional sliding engagement with the inner surface of said torque tube for the purpose of shock absorption and prevention of jamming of the screw in each limit of linear movement.

4. In a reversible motor driven actuator, a rotatably driven torque tube and torque tube nut, an actuator screw linearly driven by said nut, longitudinally spaced stops carried by said tube, a key carried by an unthreaded extension of said screw, a helical spring encircling said key, the corresponding end of said helical spring being adapted to engage the corresponding stop near the end of linear movement of said screw in that direction for the purpose of shock absorption and prevention of jamming of the screw in each limit of linear movement.

No references cited.